(12) United States Patent
Kister et al.

(10) Patent No.: US 8,607,706 B2
(45) Date of Patent: Dec. 17, 2013

(54) DEVICE FOR TEMPORARILY CONNECTING AND PYROTECHNICALLY SEPARATING TWO ASSEMBLIES

(75) Inventors: Thomas Kister, Vaux/Seine (FR); Sylvain Claudel, St Medard en Jalles (FR)

(73) Assignee: Astrium SAS, Paris (FR)

( * ) Notice: Subject to any disclaimer, the term of this patent is extended or adjusted under 35 U.S.C. 154(b) by 23 days.

(21) Appl. No.: 13/321,296

(22) PCT Filed: May 26, 2010

(86) PCT No.: PCT/EP2010/057251
§ 371 (c)(1),
(2), (4) Date: Jan. 26, 2012

(87) PCT Pub. No.: WO2010/136494
PCT Pub. Date: Dec. 2, 2010

(65) Prior Publication Data
US 2012/0111218 A1    May 10, 2012

(30) Foreign Application Priority Data

May 29, 2009  (FR) ..................................... 09 53569

(51) Int. Cl.
*B64G 1/64*       (2006.01)
*F42B 15/38*      (2006.01)
(52) U.S. Cl.
USPC ................. 102/378; 102/335; 89/1.14; 52/98
(58) Field of Classification Search
USPC .............. 102/377, 378, 335; 89/1.14; 60/225; 244/54; 52/98
See application file for complete search history.

(56) References Cited

U.S. PATENT DOCUMENTS

| 3,698,281 A | * | 10/1972 | Brandt et al. .................. 89/1.14 |
| 4,137,848 A | * | 2/1979 | Cunha ............................ 102/378 |
| 4,648,227 A |   | 3/1987 | Reusch |

(Continued)

FOREIGN PATENT DOCUMENTS

| EP | 0 472 453 A1 | 2/1992 |
| EP | 0 816 061 A2 | 1/1998 |

(Continued)

OTHER PUBLICATIONS

International Search Report for PCT/EP2010/057251; Jul. 19, 2010.

(Continued)

*Primary Examiner* — James Bergin
(74) *Attorney, Agent, or Firm* — Pearne & Gordon LLP

(57) ABSTRACT

Temporary connection and pyrotechnic separation device with a longitudinal axis (X) comprising a pyrotechnic expansion tube (14) mounted in a space (11) formed in a connection zone between a first (2) and second assembly (4) to be separated, the second assembly (4) being formed of a stack of plies (12.1, 12.2) bonded together, the two assemblies (2, 4) being connected to each other by two metal parts (10.1, 10.2), said metal parts being fixed onto the first assembly and bonded onto the outer plies (12.1) of the second assembly (4), the bonding area between said outer ply (12.1) and the adjacent inner ply (12.2) is less than the bonding area between two inner plies (12.2) forming a fuse ply, such that, when the pyrotechnic expansion tube (14) is used, the outer ply (12.1) separates from the adjacent inner ply.

8 Claims, 3 Drawing Sheets

(56) References Cited

U.S. PATENT DOCUMENTS

| | | | |
|---|---|---|---|
| 5,109,749 A * | 5/1992 | Olcer | 89/1.14 |
| 5,129,306 A | 7/1992 | Fauvel | |
| 5,372,071 A * | 12/1994 | Richards et al. | 102/378 |
| 5,585,596 A * | 12/1996 | Richards et al. | 102/378 |
| 5,993,929 A | 11/1999 | Bizer et al. | |
| 6,170,400 B1 | 1/2001 | Salort | |
| 6,250,227 B1 | 6/2001 | Salort | |
| 6,286,430 B1 | 9/2001 | Salort | |
| 7,127,994 B2 * | 10/2006 | Cleveland | 102/378 |
| 7,367,738 B2 * | 5/2008 | Cleveland | 403/31 |
| 7,509,903 B2 * | 3/2009 | Facciano et al. | 89/1.14 |
| 7,513,184 B2 * | 4/2009 | Kister | 89/1.57 |
| 7,819,048 B2 * | 10/2010 | Facciano et al. | 89/1.14 |
| 2008/0163748 A1 | 7/2008 | Facciano et al. | |
| 2013/0199359 A1 * | 8/2013 | Kister et al. | 89/1.14 |

FOREIGN PATENT DOCUMENTS

| | | |
|---|---|---|
| EP | 0 962 742 A1 | 12/1999 |
| FR | 2 779 222 A1 | 12/1999 |
| FR | 2779223 A1 | 12/1999 |
| FR | 2779224 A1 | 12/1999 |

OTHER PUBLICATIONS

Preliminary Search Report for FR0953569; Dec. 17, 2009.

* cited by examiner

DEVICE FOR TEMPORARILY CONNECTING AND PYROTECHNICALLY SEPARATING TWO ASSEMBLIES

TECHNICAL FIELD AND PRIOR ART

This invention relates to a device for temporarily connecting and pyrotechnically separating two assemblies.

Such a device can be used particularly in the aeronautical and space industry to temporarily connect two structural assemblies and to control their separation in a very short time.

In the space industry, such devices are installed for example on the top parts of launchers, or they can be used for the separation of two stages of a launcher or cutting of satellite support structures.

Firstly, these devices are designed to provide a connection between two elements so as to fix them together. In the case of launchers, they are capable of resisting longitudinal tension and compression forces between the two assembled elements. They are also designed to give reliable separation of two elements while limiting nuisances such as solid and gas pollution and shocks induced on launcher equipment and the transported payload such as a satellite.

This type of device is well known in the state of the art. Some devices cut the material, usually metal, forming the connection between the two coupled assemblies, by means of a pyrotechnic charge. However, due to the high forces that have to be applied to cut the material, generated shock levels are very high and are applied to elements near to the separation zone such as stages, equipment and/or the payload which can be harmful to them. Shock dissipation devices may be provided to reduce shock levels affecting the environment; however these devices increase the overall mass.

Another example of such a device is disclosed in document FR 2 779 222. This device comprises two assemblies to be temporarily assembled and separated, these two assemblies being fixed to each other by means of a strip bonded onto the two assemblies. A pyrotechnic expansion tube is arranged in a housing formed at the connection, breaking the bond between the strip and one of the assemblies due to shockwave transmitted to the strip.

This type of device is satisfactory because the resulting shock levels are significantly less than those that occur when a part is cut. Consequently, the pyrotechnic charge may be smaller and the constraints imposed on the elements to be separated and other peripheral systems are weaker. Dissipation devices are no longer necessary or they can be smaller. The mass of the link can then be smaller.

However, in the case in which the part from which the strip becomes separated is made of a composite material, i.e. a material formed from a stack of fibre layers embedded in a resin, there is a risk of one or several layers of the composite material tearing off, this tearing of the fibres causing pollution which is particularly prejudicial for surrounding systems such as star trackers and for the payload.

Consequently, one purpose of this invention is to propose a device for temporary connection and separation providing a separation with a low shock level causing limited pollution.

PRESENTATION OF THE INVENTION

The previously mentioned purpose is achieved by a temporary connection and separation device between two parts connected by two metal connecting elements, one of the parts is made of a composite material containing several layers, the separation being obtained by delaminating at least one of the outer layers of said part called the fuse ply, therefore the separation is made with low release of polluting elements. This is achieved by making the bonding area of the part of the layer(s) that will be separated from the remainder of the stack smaller than the connection areas between the inner layers.

In other words, separation occurs by controlled peeling within a composite material part rather than ungluing between two parts.

Particularly advantageously, the connection between metal connecting elements and the composite part comprises a layer made of an elastomer material with one face bonded to the outer fuse ply and the other face bonded to the metal connecting element.

The subject-matter of this invention is then mainly a temporary connection and pyrotechnic separation device with a longitudinal axis comprising a pyrotechnic expansion tube mounted in a space formed in a connection zone between a first and second assembly to be separated, the second assembly being formed of a stack of plies bonded together, said stack comprising two outer plies and inner plies, said plies being approximately parallel to the longitudinal direction, the two assemblies being connected to each other by at least one metal part, said metal part being fixed onto the first assembly and bonded onto one of the outer plies of the second assembly, characterised in that the bonding area between said outer ply and the inner ply adjacent to it is smaller than the bonding area between two inner plies forming a fuse ply, and in that the bonding area between the metal part and the outer ply is smaller than or equal to the area of the outer ply, such that when the pyrotechnic expansion tube is used, the outer ply becomes delaminated from the adjacent inner ply.

Particularly advantageously, the bonded connection between the metal part and the outer ply comprises an elastomer core with one face bonded onto the metal part and the other face bonded onto the outer ply.

In one example embodiment, the device according to the invention may comprise two metal parts connecting the first and the second assembly, and the second assembly comprises two fuse outer plies.

In another example embodiment, the first assembly and the housing for the pyrotechnic tube are made from a single piece, the second assembly bearing on the first assembly or being separated from it by a small clearance.

In another example embodiment, the device according to this invention may comprise two metal parts, one metal part being bonded onto an outer ply of the first assembly and fixed onto the second assembly, and the other metal part being fixed to the second assembly and bonded onto the outer ply of the first assembly, the device forming an alternate connection enabling lateral movement of one of the assemblies during separation.

For example, the metal part(s) is (are) fixed on the first or second assembly by bolting.

The first assembly may for example be made of a composite or metallic material. The metal part(s) is (are) for example made of steel or aluminium.

Another subject-matter of this invention is the use of at least one device according to this invention to temporarily assemble the elements of a space launcher. The elements may be curved in shape, several temporary connection devices then being used so as to form a sectorised connection.

BRIEF DESCRIPTION OF THE DRAWINGS

This invention will be better understood after reading the following description and the appended drawings in which.

DETAILED PRESENTATION OF PARTICULAR EMBODIMENTS

Figure 1A:
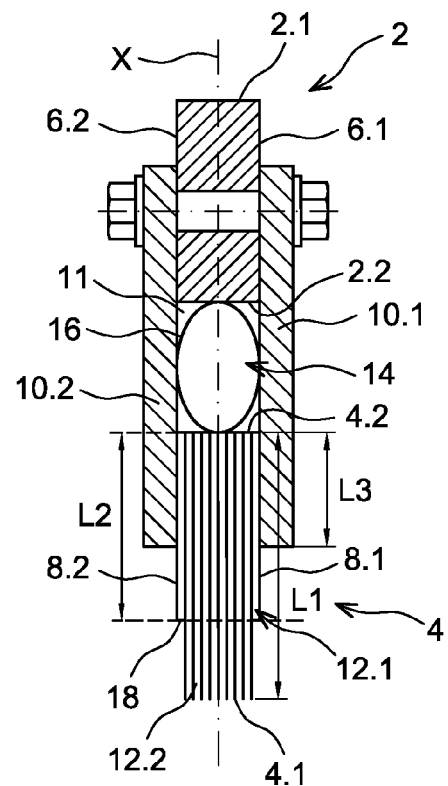
FIG. 1A is a longitudinal sectional view of a first embodiment of a temporary connection and separation device according to this invention, in a connection state.
Figure 1B:
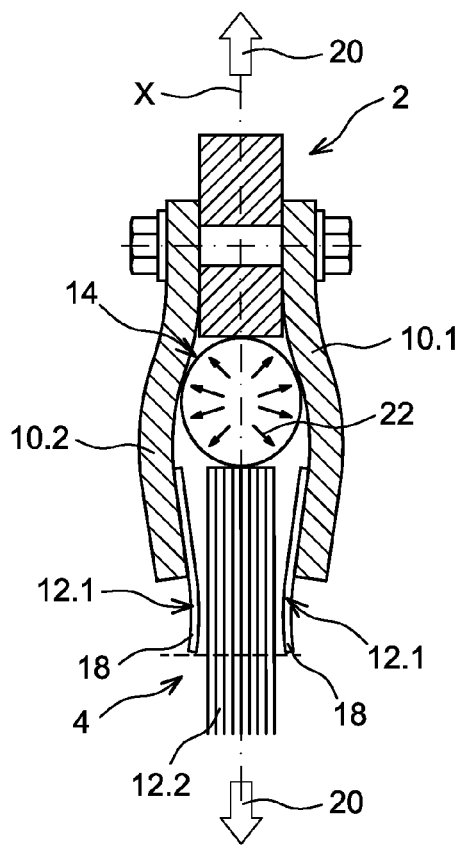
FIG. 1B is a view of the device in FIG. 1A in a separation state.

FIG. 1A shows a first example of a temporary connection and separation device for two assemblies 2, 4 according to this invention.

The assemblies 2 and 4 are structural assemblies that are to be kept assembled for a given time and that are then to be separated. For example, they may be two stages of a launcher that are to be separated after the launch.

In the example shown, the two assemblies 2, 4 are assembled along a longitudinal direction X.

Figure 4:
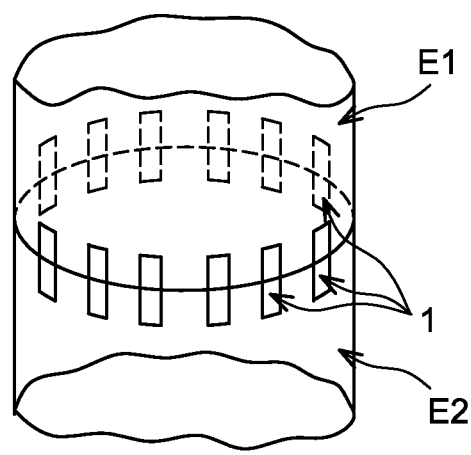
FIG. 4 is a schematic view of two stages of a launcher fixed by sectorised connections to which the invention can be applied.

FIG. 4 contains a partial schematic representation of two stages E1, E2 of a launcher with connection devices 1 according to this invention. In this example, the assemblies 2, 4 are formed by two curved plates, more precisely cylindrical plates.

This invention is obviously applicable to the connection of plane plates.

FIGS. 1A and 1B, 2A and 2B, show two longitudinal sectional views of example embodiments of a connecting device according to the invention. In the remainder of the description, we will refer to each assembly 2, 4 as a "plate" for reasons of simplicity.

We will use the adjectives "distal" and "proximal" to qualify the position of the ends of assemblies 2, 4 relative to the connection zone of the two assemblies 2, 4.

The plate 2 comprises a distal end 2.1 and a proximal end 2.2 connected by two faces 6.1, 6.2, and the assembly 4 comprises a distal end 4.1 and a proximal end 4.2 connected by two faces 8.1, 8.2. The proximal ends 2.2, 4.2 are arranged facing each other and at a distance so as to form a space 11. The connection device comprises two strips or fishplates 10.1, 10.2 overlapping the separation zone between the two assemblies 2, 4. Strip 10.1 connects face 6.1 and face 8.1, and strip 10.2 connects face 6.2 and face 8.2.

In the example shown, the strips 10.1, 10.2 are fixed onto the plate 2 by means of a bolted connection. But obviously, other types of connection can be used.

According to this invention, the material used to make the assembly 4 is a composite material formed by a stack of plies of which the outermost plies of the stack are capable of separating from the remainder of the stack. The strips 10.1, 10.2 are fixed onto the outer plies 12.1 of the plate 4 by bonding. The outer plies 12.1 are referred to as "fuse plies" in the remainder of the description.

The plies are arranged so that they are approximately in line with the longitudinal axis X of the connection and can be oriented so as to be transverse to the force applied when the pyrotechnic expansion tube is used, as we will see below.

Each ply is formed from aligned or woven fibres. For example, the plate 4 is formed from single-directional plies oriented in the direction of the tension and compression forces, the plies being embedded in a matrix of thermosetting resin.

According to this invention, it is only planned to separate the outermost plies 12.1 of the stack.

The length of the inner plies along the longitudinal direction X is L1. The length of the bonding zone between the outer fuse plies 12.1 and the innermost plies 12.2 is L2. The length of the bonding zone between the outer fuse plies 12.1 and the strips 10.1, 10.2 is L3.

According to this invention, L2 is less than L1 and L2 is greater than or equal to L3. This controls delaminating of the outer plies 12.1 from the inner plies 12.2.

This description refers to the length of the bonding zone as seen on the sectional views for reasons of simplicity. However, it is understood that the bonding zones are areas and that the above relations between lengths are transposed to bonding areas.

The connection strips 10.1, 10.2 are made of a metallic material, for example aluminium or steel.

The plate 2 may be made from any appropriate material, for example a metal alloy or composite material in order to reduce the mass of the assembly.

The choice of the connection type between strips 10.1, 10.2 and the assembly 2 is made as a function of tension and compression stresses applied to the connection.

The connection between the strips 10.1, 10.2 and the outer plies 12.1 is obtained by bonding. In a particularly advantageous manner, this connection includes an elastomer part in the form of a plate with one face bonded onto a strip 10.1, 10.2 and another face bonded onto an outer ply 12.1. The presence of elastomer increases the strength of the charge in shear and absorbs some of the shockwave generated by the explosion of the pyrotechnic charge, which reduces risks of damage to surrounding systems.

A pyrotechnic expansion tube 14 fits into the housing 11 formed between the two proximal ends 6.2, 8.2 of plates 2, 4 and the two connection strips 10.1, 10.2. This tube 14 is similar to tubes used in the state of the art and known to those skilled in the art.

To facilitate understanding, we will just mention that the pyrotechnic expansion tube 14 comprises a sealed and deformable metal envelope 16, a detonating cord (not shown) and a flexible material (not shown) inserted between the detonating cord and the envelope 16. The main function of the flexible material is to centre the detonating cord within the envelope. For example, it may be made of silicone rubber. Before firing, the envelope 16 has an oblong general shape (FIG. 1A), for example in the form of a flattened circle or an oval. The housing 11 has an approximately rectangular section adapted to the oblong section of the tube, such that the smallest dimension of the oblong section of the tube 14 is approximately orthogonal to the surfaces of the two strips 10.1, 10.2.

It is understood that this invention is not restricted to the case in which the pyrotechnic expansion tube is straight, cases in which the tube is curved are included within the scope of this invention, for example to match the curved shape of plates such as the plates in FIG. 4.

In practice, the plate 4 may be made using different methods.

For example, a stack is made composed of n fibre plies 12.2 with approximately the same area and particularly the same length, and two plies 12.1 with a smaller area, more particularly a shorter length L2, placed on each of the outer faces of the stack of n plies. This stack of n+2 plies is then embedded in a resin using a known method.

The distal end of the outer plies 12.1 denoted by reference 18 can be seen in FIG. 1A.

The dimension of the pyrotechnic expansion tube is small and is adapted to the force to be applied to separate the plies of the composite material. Therefore, the generated shock level is significantly less than is obtained with tubes used in the metal part cutting devices.

In the example shown, the faces 6.1 and 8.1 of the two plates 2, 4, and the faces 6.2 and 8.2 of the two plates 2, 4 are arranged approximately in the same plane. But this configuration is in no way limitative. For example, it would be possible for the plate of the first assembly 2 to be thicker than the plate of the second assembly 4 or vice versa. In this case, the strips would be in the deformed state when assembled and/or have a variable thickness.

We will now explain operation of the device according to this invention.

The two plates 2, 4 are temporarily assembled by means of connection strips 10.1 and 10.2, these strips providing the required tension and compression strengths.

When separation of the two plates 2, 4 is required, the pyrotechnic charge is ignited, generating a shockwave transmitted to the strips 10.1, 10.2 and the plate 4. Gas is also generated causing expansion of the envelope 14 of the expansion tube 11. This expansion takes place mainly along a direction transverse to the strips, as is symbolised by the arrows 22 in FIG. 1B.

The effect of the shockwave is to cause the outer plies 12.1 to become delaminated from the inner plies 12.2. Delaminating starts at the distal end 18 of the outer plies 12.1 and propagates to the proximal end of the fuse ply over the length L2.

Furthermore, due to its expansion, the envelope 14 applies approximately transverse forces on the strips 8, 10. These forces make the outer fuse plies move away from the inner plies. This example embodiment has the advantage of leaving the strips fixed to one of the elements, which reduces pollution.

The shockwave essentially causes peeling of the plies, the mechanical force applied by the tube envelope possibly contributing to the delaminating and to the separating movement of the outer fuse plies, or only to the separating movement of the outer fuse plies.

In the example shown, the distal end of the outer fuse plies 12.1 goes beyond the connection strips 10.1, 10.2, but it is understood that the distal end 18 of the outer fuse plies 12.1 could be at the same level as the end of the strips or could be set back from them.

The length L2 of the outer plies is chosen to be sufficiently short relative to the length L1 of the outer plies to be sure that the outer plies separate from the inner plies.

For example, the bonding length is between a few mm and a few tens of cm. The fuse ply can project by a few cm beyond the end of the connecting strip or it may be set back from it by a few mm.

Figure 2A:
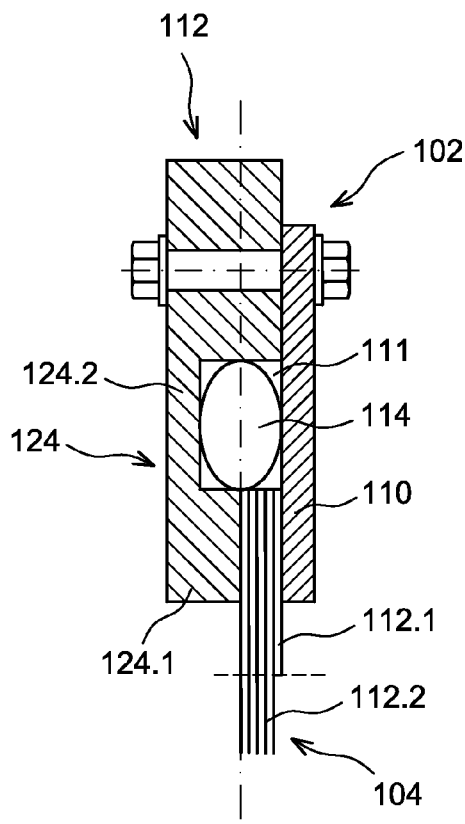
FIG. 2A is a longitudinal sectional view of a second embodiment of a device according to this invention in a connection state.
Figure 2B:
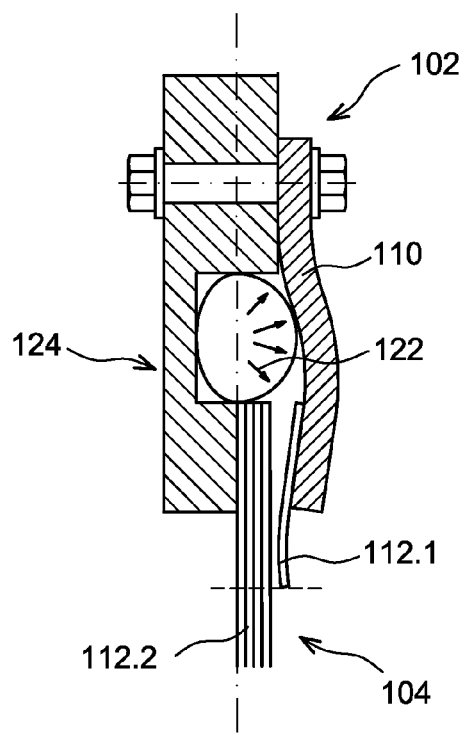
FIG. 2B is a view of the device in FIG. 2A in a separation state.

FIGS. 2A and 2B show another example embodiment in which a single connecting strip is used.

In this case, the connection according to the invention is larger so as to provide a reliable connection.

In this other example, the connection comprises a strip 110 fixed to the first assembly 102 and bonded to the second assembly 104, and a bearing part 124 fixed on the first assembly 102, the pyrotechnical tube 114 being placed in a housing 111 formed between the bearing part 124 and the second assembly 104.

In the example shown, the bearing part 124 and the first assembly 102 are made in a single piece, and comprise a recess delimiting three sides of the housing 111, the fourth side being formed by the strip 110.

The strip 110 is fixed at a first end to the first assembly 102 by bolting, and it is bonded to plate 104.

The plate 104 may either bear on the support part 124 or there may be a small clearance between the plate 104 and the bearing part 124.

The pyrotechnic tube 114 is placed in the recess 111.

In this example embodiment, only the face of the plate 104 on which the strip 110 is bonded comprises a fuse ply 112.1 for which delaminating is facilitated. This fuse ply 112.1 is similar to the plies described in relation to the first example.

We will now explain separation of the two assemblies.

When separation is required, the pyrotechnic tube 114 is ignited. When the explosion occurs, a shockwave is generated that is applied to the strip 110 and the plate 102 causing total or partial delaminating of the fuse ply 112.1. The envelope expands under the effect of gases and applies radial forces 122 onto the bearing part 124 and the strip 110. These radial forces 122 have the effect of causing the end of delaminating of the fuse ply if necessary, and separation of the fuse ply from the inner plies 112.2.

The temporary connection and separation device according to this invention has the advantage of guaranteeing separation when the pyrotechnic charge is ignited.

This temporary connection and separation device can also reduce pollution risks.

This device is simple to make and is lightweight.

Furthermore, since the power required by the pyrotechnical expansion tube is reduced, the shock applied to the surrounding elements is reduced.

The mass of the device is also reduced because the pyrotechnic expansion tube is smaller and shock dissipaters are eliminated or are smaller.

This invention may also be applied to a so-called alternate connection that is used particularly when it is required to force the detached assembly to move laterally.

Figure 3:
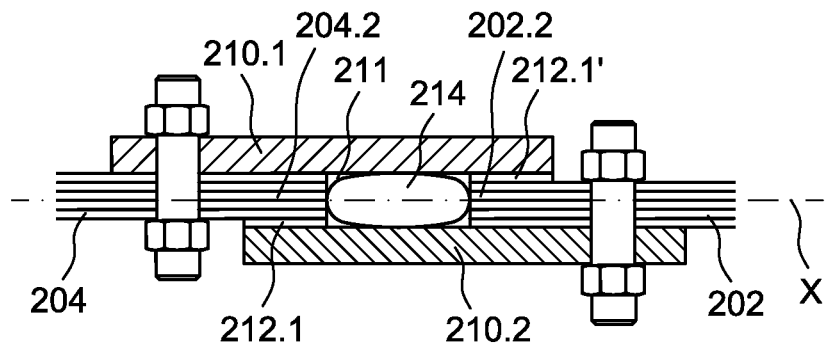
FIG. 3 is a longitudinal sectional view of an example embodiment of a so-called alternate link according to this invention.

FIG. 3 shows an example representation of such a connection.

This connection comprises two plates 202, 204 made of a composite material connected by metallic connection strips 210.1, 210.2. The two proximal ends 202.2 and 204.2 are arranged facing each other at a distance so as to form a housing 211 for the pyrotechnic tube 214.

The strip 210.1 is fixed onto the plate 202 by a screw-nut assembly and is bonded onto the plate 204, and the strip 210.2 is fixed onto the plate 204 by a screw-nut assembly and is bonded onto the plate 202. As for the other embodiments, each plate 202, 204 comprises an outer fuse ply 212.1, 212.1' onto which plates 202, 204 respectively are bonded.

When the pyrotechnic tube is activated, fuse ply 212.1 delaminates from plate 202 and fuse ply 212.1' delaminates from plate 204. This type of architecture enables the detached part to move away laterally.

The assemblies 202, 204 may have curved or cylindrical shapes. In this case, the connections according to this invention are in the form of sectors, i.e. several connecting strips are distributed around the contour of the assemblies temporarily fixed together.

This invention is particularly applicable to the connection and separation of elements of a space launcher.

The invention claimed is:

1. Temporary connection and pyrotechnic separation device with a longitudinal axis comprising a pyrotechnic expansion tube mounted in a space formed in a connection zone between a first and a second assembly to be separated, the second assembly being formed of a stack of plies bonded together, said stack comprising two outer plies and inner plies, said plies being approximately parallel to the longitudinal direction, the two assemblies being connected to each other by at least one metal part, said metal part being fixed onto the first assembly and bonded onto one of the outer plies of the second assembly, the bonding area between said outer ply and the inner ply adjacent to it being smaller than the bonding area between two inner plies forming a fuse ply, and the bonding area between the metal part and the outer ply is smaller than or equal to the area of the outer ply, such that when the pyrotechnic expansion tube is used, the outer ply becomes delaminated from the adjacent inner ply.

2. Device according to claim 1, in which the bonded connection between the metal part and the outer ply comprises an elastomeric core with one face bonded onto the metal part and the other face bonded onto the outer ply.

3. Device according to claim 1, comprising two metal parts connecting the first and the second assembly, and the second assembly comprises two fuse outer plies.

4. Device according to claim 1 in which the first assembly and a housing for the pyrotechnic tube are made from a single piece, the second assembly bearing on the first assembly or being separated from it by a small clearance.

5. Device according to claim 1, comprising two metal parts, one metal part being bonded onto an outer ply of the first assembly and fixed onto the second assembly, and the other metal part being fixed to the second assembly and bonded onto the outer ply of the first assembly, the device forming an alternate connection enabling lateral movement of one of the assemblies during separation.

6. Device according to claim 1, in which the metal part(s) is (are) fixed on the first or second assembly by bolting.

7. Device according to claim 1, in which the first assembly is made of a composite or metallic material.

8. Device according to claim 1, in which the metal part(s) is (are) made of steel or aluminium.

* * * * *

UNITED STATES PATENT AND TRADEMARK OFFICE
CERTIFICATE OF CORRECTION

PATENT NO. : 8,607,706 B2  
APPLICATION NO. : 13/321296  
DATED : December 17, 2013  
INVENTOR(S) : Kister et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 59 days.

Signed and Sealed this
Twenty-second Day of September, 2015

Michelle K. Lee
*Director of the United States Patent and Trademark Office*